June 6, 1961  F. C. WILLIAMS  2,987,671
ELECTRIC CURRENT GENERATOR
Filed Sept. 9, 1957  2 Sheets-Sheet 1

Inventor:
Frederic Calland Williams
By
Stevens, Davis, Miller & Mosher
Attorneys June 6, 1961  F. C. WILLIAMS  2,987,671
ELECTRIC CURRENT GENERATOR
Filed Sept. 9, 1957  2 Sheets-Sheet 2

Inventor:
Frederic Calland Williams
By Stevens, Davis, Miller + Mosher
Attorneys United States Patent Office 2,987,671
Patented June 6, 1961

2,987,671
ELECTRIC CURRENT GENERATOR
Frederic C. Williams, Romiley, England, assignor to National Research Development Corporation, London, England, a British corporation
Filed Sept. 9, 1957, Ser. No. 682,861
Claims priority, application Great Britain Sept. 14, 1956
19 Claims. (Cl. 324—70)

This invention relates to an electric current generator suitable for use, inter alia, in a tachometer instrument for measuring the speed of rotation of a moving object or in an arrangement for controlling the speed of rotation of such an object and to tachometer instruments and speed controlling arangements embodying such current generators.

The principal object of the invention is to provide an improved form of generator of the tachometer type which does not employ any commutator, slip rings or brushes, which is capable of being operated in a fashion which provides a current output related to the speed of rotation with a high degree of linearity and which may be arranged to operate with a high order of accuracy at both high and very low speeds of rotation.

A generator according to the invention comprises an electrically conductive member arranged for rotation relative to a primary magnetic field and means for sensing the secondary magnetic field resulting from the circulating currents induced in said conductive member due to its rotation in said primary magnetic field.

In one particular form a generator according to the invention comprises an electrically conductive member arranged for rotation within a stationary and unidirectional primary magnetic field, said member being adapted to be coupled to the object whose speed of rotation is to be measured or controlled, and means for determining the magnitude of the secondary magnetic field resulting from the circulating currents induced in said member due to its rotation in said primary magnetic field.

The induced magnetic field is essentially the armature reaction field of a rotating dynamo electric machine and is disposed at 90° to the primary magnetising field. In a preferred form of tachometer generator according to the invention this induced field is examined by means of a flux detector of the so-called second harmonic type and a feature of the invention is the use of the great sensitivity of this form of flux detector to sense a null field condition created by the opposition of the aforesaid induced field by a further field produced by a further electromagnet winding.

In order that the nature of the invention may be more readily understood a number of embodiments thereof will now be described by way of illustrative example with reference to the accompanying drawings. In these drawings:

FIG. 1 is a diagrammatic transverse cross-section taken through one form of generator according to the invention while

FIG. 5 is a further block diagram showing a speed controlling arrangement according to the invention while

Figure 1:
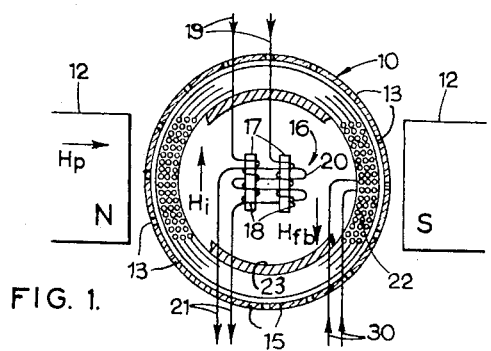
Figure 2:
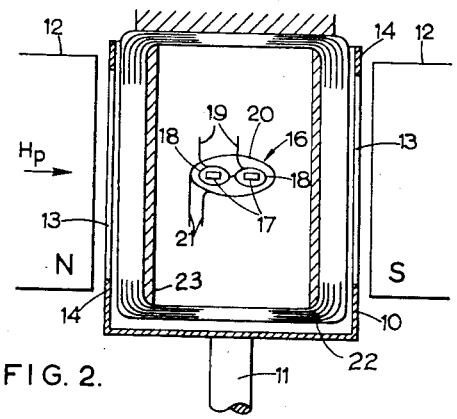
FIG. 2 is a further diagrammatic axial cross-section of the generator.
Figures 3, 7:
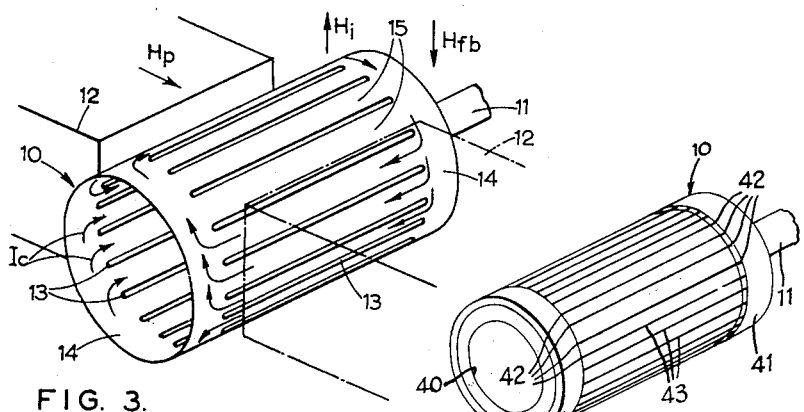
FIG. 3 is a perspective view, largely of diagrammatic form, showing the arrangement of one type of rotatable conductive member.
FIG. 7 is a perspective view of an alternative form of rotor.

Referring first to FIGS. 1, 2 and 3, the generator shown comprises an electrically conductive member in the form of a squirrel cage rotor 10, made of non-magnetic electrically conductive material, such as a non-ferrous metal. This rotor is mounted on or is coupled to a shaft or other rotating member 11 whose speed of rotation is to be measured or controlled. The rotor 10 is located between the opposing pole tips 12 of a magnetic system serving to provide a primary magnetic field $Hp$ of predetermined constant strength. Such magnetic system may conveniently be one formed by or embodying a permanent magnet.

The rotor 10 conveniently comprises a cylinder of conductive metal as shown more clearly in FIG. 3 in which are cut a series of axially directed slots 13 which serve to divide the cylinder into two end ring portions 14 which are connected at spaced circumferential intervals by axially directed conductor portions 15. In an alternative construction, shown in FIG. 7, the rotor 10 may consist of a support body 40 of non-conductive material on or in which are mounted metal end rings 41 of substantial cross-section and accordingly having a low electrical resistance, opposite, preferably equi-spaced, points 42 around the circumference of each of the two opposing end rings being connected by a plurality of thin axially disposed wires 43. It is of advantage from the practical standpoint that the electrically conductive material used for forming the rotor should be one having a small temperature coefficient of resistance. Use may conveniently be made of the well known metal, Constantan, i.e. an alloy of about 40% nickel and 60% copper.

In such an arrangement, as the rotor 10 is rotated in the primary magnetic field $Hp$ between the magnet pole tips 12, circulating currents will be induced in the rotor structure and will flow, for example, as indicated by the arrows $Ic$ in FIG. 3. These circulating currents will give rise to an induced magnetic field, such as is indicated at $Hi$, which is perpendicular to the primary magnetic field $Hp$. Such induced magnetic field $Hi$ is, according to the invention, examined and used to determine the amplitude of the output current from the generator and for this purpose there is provided flux detecting means 16 which may be of any convenient form but which, in a preferred arrangement according to the invention and as illustrated, is constituted by a second harmonic type flux detector comprising two small parallel strips 17 of high permeability material, for instance, a nickel/iron alloy such as those known under the trade names "Permalloy" or "Mu-metal." Such strips 17 are each provided with an individual energising electromagnet winding 18, the two windings 18 being connected in series in opposing sense and joined by way of suitable connecting leads to input terminal means which are in turn connected to a source of alternating current of a first frequency $f$. A further output electromagnet winding 20 is wound so as to embrace both of the strips 17 and this is connected by way of leads 21 to means for detecting the presence of any output alternating current induced in such winding 20 and having the frequency of the second harmonic $2f$ of the energising source.

In the operation of such an arrangement no output will normally be derived from the output winding 20 in the presence only of the primary magnetic field $Hp$ and with the rotor 10 stationary as there will be no induced currents in such rotor. When, however, induced currents flow in the rotor 10 due to the relative movement of the latter with respect to the primary magnetic field $Hp$, the resultant induced magnetic field $Hi$ provides an external biasing field at right angles to the primary magnetic field and there will be generated in the winding 20 an output current which is the second harmonic component $2f$ of the input current $f$ supplied to the windings 18. Furthermore, the phase relationship of this second harmonic component $2f$ to a reference second harmonic frequency $2f$, of constant phase and derived directly from the input current source will depend upon the direction of the biasing field which is set up.

A measure of the rotational speed of the shaft 11 or other device by which the rotor 10 is caused to rotate, may be obtained by measurement of the magnitude of the alternating current component of frequency $2f$ which is derived from the output winding 20 while examination of the phase relationship of this second harmonic component to the aforesaid reference harmonic of the input current will provide an indication of the direction of rotation of the rotor 10. To achieve these results the strips 17 of the flux detector 16 should not themselves be completely saturated by the induced magnetic field $Hi$.

In order to ensure a high degree of linearity in the relationship between the speed of rotation of the rotor 10 and the output current provided by the flux detector device 16 for use in measuring or control purposes, it is desirable to arrange for the employment of degenerative feedback and for this purpose a further winding 22 is provided and is mounted in a stationary former 23 which is conveniently disposed within the structure of the rotor 10. This further winding 22 is so constructed, oriented and energised when in use as to produce a magnetic field $Hfb$ which directly opposes the induced field $Hi$.

Figure 4:
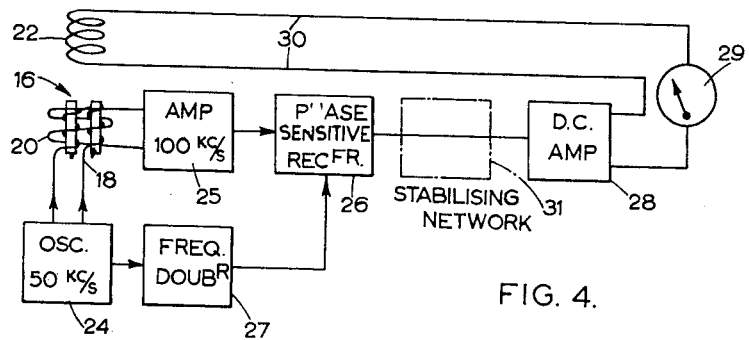
FIG. 4 is a block diagram showing a speed measureing arrangement according to the invention.

One particular apparatus arrangement for providing a tachometer instrument for speed measuring purposes and utilising a generator as described above with relation to FIGS. 1–3, is illustrated in block schematic form in FIG. 4. In this speed measuring arrangement the energising windings 18 of the flux detector 16 are supplied with the output of a suitable source 24 of electric oscillations arranged to operate at a predetermined frequency $f$ of, say, 50 kc./s. The output winding 20 of the phase detector 16 is connected to the input of a tuned filter/amplifier 25 which is resonant to pass and amplify the second harmonic frequency $2f$, e.g. 100 kc./s., and the output signal provided by such amplifier is then applied to and rectified in a phase sensitive rectifier circuit 26 which can be of any suitable known form, such phase sensitive rectifier circuit having the usual second or reference input which is supplied with current also at the aforesaid second harmonic frequency $2f$ and derived from the oscillation source 24 by way of a frequency doubling circuit 27. The latter may likewise be of any convenient and well known form.

The resultant direct current output from the rectifier circuit 26 has an amplitude related to the induced magnetic field $Hi$ and hence to the speed of rotation of the rotor 10 and has a polarity sense which is determined by the direction of the field $Hi$ and hence by the direction of rotation of the rotor. This direct current output is then applied to a direct-current amplifier 28 of any convenient known form and the output from this amplifier is then applied to energise the further or feedback winding 22 of the device by way of leads 30, one of such leads having connected in series therewith a current measuring instrument 29 which may be calibrated to provide a direct visual indication of the speed of rotation of the rotor 10.

The gain around the feedback loop including the amplifier 28 and winding 22 is made very high so that the feedback current supplied to the winding 22 is effectively adjusted automatically to produce very nearly the same flux conditions in the neighbourhood of the flux detector means 16 as exist when the rotor 10 is completely stationary. In order to prevent oscillation in the feedback system a stabilising network may be found desirable and is indicated in chain dotted lines at 31. The form of such stabilising network can follow that dictated by normal servo theory and design.

Figure 5:
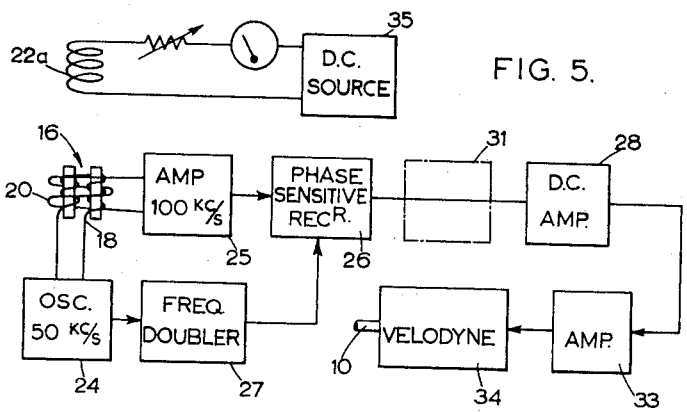

FIG. 5 hows the use of a generator, such as that described with relation to FIGS. 1–3, within an automatic speed control system. In this arrangement the energising windings 18 of the flux detector 16 are supplied with alternating current of a predetermined frequency $f$ from a suitable oscillation source 24 as in the arrangement of FIG. 4. The output winding 20 is connected, again as in FIG. 4, to the input of a tuned filter/amplifier 25 adapted to select and amplify the second harmonic component of frequency $2f$ present in the winding 20. This amplifier provides one input to a phase sensitive rectifier 26 which, again as in FIG. 4, is provided with a second or reference input of frequency $2f$ provided by the frequency doubler circuit 27 which is supplied from the oscillation source 24. The resultant D.C. output current from the phase sensitive rectifier 26 is applied, again as in FIG. 4, to a D.C. amplifier 28 with the incorporation, if necessary, of a stabilising network 31. The output of the D.C. amplifier 28 is fed in this instance to a further amplifier 33 whose output is used to control a variable speed drive such as a velodyne 34 to which the shaft 11 and rotor element 10 of the generator itself is coupled. The further magnetising winding $22a$, which is equivalent to the feedback winding of the generator device, is connected to a source of direct energising current 35, such circuit including control means in the form of a variable resistance or rheostat and preferably also a current indicating meter. The value of the direct current fed to the winding 22 determines the speed at which the system will be held to rotate by the speed control system.

In this embodiment the velodyne 34 and its controlling input will operate to keep the speed of rotation of the rotor 10 of the generator at a value such that the induced field $Hi$ is just sufficient to cancel the additional field, equivalent to the field $Hfb$ of FIG. 1 or FIG. 3, which is set up by the direct current energisation of the further winding $22a$. Thus, the rheostat or other means for controlling the amplitude of the D.C. current fed from the source 35 constitutes a speed adjusting means while the indicating meter, if included, may conveniently be calibrated in terms of rotational speed.

It is also possible to utilise an arrangement broadly similar to that of FIG. 5 for measuring the intensity of some external field, such as the earth's magnetic field. In this alternative use, the winding $22a$ and the current supply thereto is not employed and the field to be measured is arranged to oppose the induced field $Hi$. The rotational speed of the rotor, conveniently indicated by means of a meter connected to the amplifier 28, is then a measure of the field intensity. The meter used may therefore be calibrated directly in field intensity units.

A number of structural variations are clearly possible. For instance, if it is assumed that the primary magnetic field $Hp$ between the magnet pole tips 12 is of substantially uniform density throughout the whole of its cross-section and the rotor end rings are each of zero resistance, the induced current density in the rotor necessarily follows a substantially sinusoidal distribution. The conductors of the winding 22 or $22a$ are then, in the preferred and idealised form, given a similar sinusoidal distribution as it is desirable that the geometry of the feedback winding 22 or cross-magnetising winding $22a$ should follow as closely as possible the geometry of the eddy current paths in the rotor. If the primary magnetising field $Hp$ is highly concentrated, such as by the use of small or shaped pole tips 12, then the winding 22 or $22a$ should be similarly concentrated.

It is desirable that the flux detector means 16 should occupy as small a physical space as possible and be disposed near to the centre of the rotor structure. With this object in view the strips 17 are preferably placed face-to-face instead of edge-to-edge as shown in FIG. 2 and their spacing distance reduced to a minimum. Such detector means should occupy as far as possible, a volume of the space between the magnet pole tips 12 where the primary magnetic field Hp is of substantially uniform density.

Figure 6:
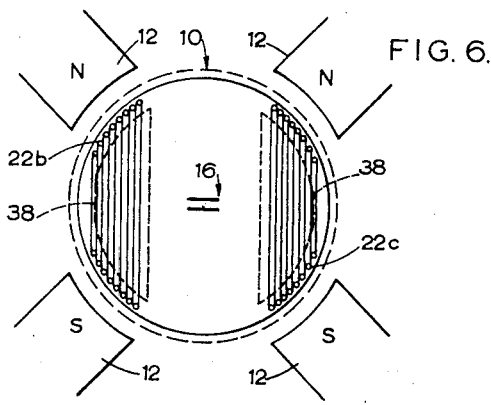
FIG. 6 is a diagrammatic cross-sectional view, similar to FIG. 1, of an alternative form of generator construction.

The generator construction shown in FIGS. 1, 2 and 3 may be modified and improved by employing a multi-polar structure as shown in FIG. 6 where four pole tips 12 are provided lying at quadrature to each other, one adjacent pair being of one polarity and the opposing adjacent pair of the opposite polarity. In this instance the feedback or cross-magnetising coil winding such as that forming the equivalent of the windings 22 or 22a of the earlier figures, is divided into two sections 22b and 22c. The resultant "tangent galvanometer" effect of such a modified arrangement results in a substantially large volume of uniform primary magnetic field Hp near to the centre region of the rotor for accommodating the flux detector device 16 such as already described. A further improvement in performance may be obtained by providing ferro-magnetic members 38 positioned within the rotor so as to reduce the air gap of the primary magnetic field Hp while not acting so as magnetically to short circuit the induced magnetic field Hi.

Other constructed variations will be obvious, for example, while in the arrangements described the feedback or cross-magnetising winding or windings 22 and 22a or 22b, 22c has/have been shown as mounted inside the rotor structure such winding or windings could equally well be located outside the rotor or be constituted by a winding having portions both inside and outside such rotor.

I claim:

1. An electric current generator which comprises an electrically conductive member arranged for rotation within a stationary and unidirectional primary magnetic field, said member being adapted to be coupled to an object whose speed of rotation is to be measured or controlled, and means for determining the magnitude of the unidirectional secondary magnetic field resulting from the circulating currents induced in said member due to its rotation in said primary magnetic field.

2. An electric current generator which comprises means providing a stationary and unidirectional primary magnetic field, an electrically conductive member arranged for rotation within said primary magnetic field, said conductive member including coupling means for effecting its coupling to an object whose speed of rotation is to be measured or controlled, means for determining the magnitude of the unidirectional secondary magnetic field resulting from the circulating currents induced in said conductive member due to its rotation in said primary magnetic field and means for determining the polarisation direction of said unidirectional secondary magnetic field.

3. An electric current generator which comprises means providing a stationary and unidirectional primary magnetic field, an electrically conductive member arranged for rotation in said primary magnetic field, said member including coupling means for effecting its coupling to an object whose speed of rotation is to be measured or controlled and a flux detector of the second harmonic type disposed within said electrically conductive member for determining the magnitude and polarisation direction of the unidirectional secondary magnetic field resulting from the circulating currents induced in said conductive member by its rotation in said primary magnetic field.

4. A generator according to claim 3 which includes an electromagnet winding arranged, upon suitable energisation, to produce a unidirectional magnetic field opposing that of said unidirectional secondary magnetic field.

5. A generator according to claim 4 in which said electromagnet winding is disposed inside said rotor but outside the means for sensing or determining the magnitude of said secondary magnetic field.

6. A generator according to claim 5 in which the arrangements are such that a null field condition can be set up in the vicinity of said flux detector, the magnitude and direction of flow of current in said opposing field electromagnet winding providing a measure of the speed and direction of rotation of said rotating object.

7. A generator according to claim 6 in which said electrically conductive rotatable member comprises a rotor of the squirrel-cage type.

8. A generator according to claim 7 in which said squirrel-cage rotor comprises a pair of spaced end rings of substantial cross-section and of low electrical resistance and a plurality of thin wires interconnecting opposite spaced points around the circumference of each ring.

9. A generator according to claim 8 in which said rotor is formed of electrically conductive material having a small temperature co-efficient of resistance.

10. A generator according to claim 2 in which said means providing said unidirectional primary magnetic field comprises a permanent magnet.

11. A generator according to claim 4 in which said primary magnetic field is provided by a system including at least four separate pole tips disposed around said rotatable conductive member.

12. A generator according to claim 11 in which said electromagnet winding is divided into two parts.

13. A generator according to claim 12 which includes additional ferro-magnetic members within said rotor for reducing the air gap length of said primary magnetic field.

14. A generator according to claim 3 wherein said flux detector comprises two small and parallel strip-like elements of high permeability magnetic material, each provided with an individual electromagnet winding, said windings being connected in series in opposing sense and joined to energising input terminal means, and a further output winding embracing both of said two strip-like elements, said strip-like elements being disposed within said rotating member in a position substantially coincident with the centre of the cross-section of the primary magnetic field passing through said member and parallel with the flux direction of said secondary magnetic field.

15. A speed measuring arrangement comprising a generator as claimed in claim 14 in combination with a source of oscillations of a first frequency $f$ connected to said input terminal means, filter circuit means tuned to frequency $2f$ connected to receive output signals from said output winding, a current rectifier connected to the output of said filter circuit means and an indicator device connected for operation by the output of said current rectifier.

16. A speed measuring arrangement according to claim 15 in which said current rectifier is of the phase-sensitive type and is arranged to be supplied with a reference oscillation formed by a frequency doubled version of the oscillations of said oscillation source of frequency $f$.

17. A speed measuring arrangement comprising a generator as claimed in claim 14 in combination with a source of oscillations of a first frequency $f$ connected to said input terminal means, filter circuit means tuned to frequency $2f$ connected to receive output signals from said output winding, a current rectifier connected to the output of said filter means and the output of said filter circuit means being connected through a suitable amplifier to said electromagnet winding so as to provide a degenerative feedback loop.

18. A speed measuring arrangement according to claim 17 in which said feedback loop includes a stabilising circuit.

19. An automatic speed control arrangement comprising a generator as claimed in claim 14 in combination with a source of oscillations of frequency $f$ connected to said input terminal means, filter circuit means tuned to frequency $2f$ connected to receive output signals from said output winding, a current rectifier of the phase-sensitive type connected to the output of said filter means and supplied with a reference oscillation consisting of a frequency doubled version of the oscillations of said oscillation source, a velodyne device energised by the output from said current rectifier arranged to control the speed of rotation of said rotor of said generator and means for energising said electromagnet winding of said generator to an extent determined by the desired controlled speed of rotation.

References Cited in the file of this patent

UNITED STATES PATENTS

| | | |
|---|---|---|
| 1,068,134 | Hutchison | July 22, 1913 |
| 2,581,093 | Gille | Jan. 1, 1952 |
| 2,768,315 | Okabe | Oct. 23, 1956 |